United States Patent
Tanaka et al.

[11] Patent Number: 5,990,206
[45] Date of Patent: Nov. 23, 1999

[54] ASPHALT MODIFIER COMPOSITION AND ASPHALT COMPOSITION

[75] Inventors: Shingo Tanaka; Takayuki Ikenaga, both of Wakayama, Japan

[73] Assignee: Kao Corporation, Tokyo, Japan

[21] Appl. No.: 08/969,553

[22] Filed: Nov. 13, 1997

Related U.S. Application Data

[62] Division of application No. 08/807,149, Feb. 27, 1997, abandoned.

[30] Foreign Application Priority Data

Feb. 28, 1996 [JP] Japan .................................. 8-840833

[51] Int. Cl.$^6$ .................................................. C08L 95/00
[52] U.S. Cl. .............................. 524/59; 524/68; 524/69; 524/70; 524/71
[58] Field of Search ................ 524/59, 68, 69, 524/70, 71

[56] References Cited

U.S. PATENT DOCUMENTS

| | | | |
|---|---|---|---|
| 2,592,564 | 4/1952 | Hardman | 106/284.1 |
| 2,693,425 | 11/1954 | Hardman | 106/284.1 |
| 2,997,454 | 8/1961 | Leistner et al. | 524/140 |
| 3,404,140 | 10/1968 | Fukumoto et al. | 524/140 |
| 3,776,806 | 12/1973 | Mayer et al. | 524/145 |
| 3,878,162 | 4/1975 | Breitschaft | 524/140 |
| 4,123,420 | 10/1978 | Kyo et al. | 524/145 |
| 4,217,434 | 8/1980 | Koeble | 524/140 |
| 4,244,911 | 1/1981 | Ishizaka et al. | 524/145 |
| 4,251,436 | 2/1981 | Silberberg et al. | 524/145 |
| 4,581,290 | 4/1986 | Henkel et al. | 524/140 |
| 4,659,381 | 4/1987 | Walters | 524/59 |
| 4,704,417 | 11/1987 | Bonin et al. | 524/140 |
| 4,804,696 | 2/1989 | Jolitz et al. | 524/68 |
| 4,882,373 | 11/1989 | Moran | 524/68 |
| 5,070,123 | 12/1991 | Moran | 524/69 |
| 5,095,055 | 3/1992 | Moran | 524/69 |
| 5,104,983 | 4/1992 | Stock et al. | 524/145 |
| 5,185,393 | 2/1993 | Kanda et al. | 524/145 |
| 5,516,817 | 5/1996 | Slusher et al. | 524/69 |
| 5,618,862 | 4/1997 | Germanaud et al. | 524/71 |

FOREIGN PATENT DOCUMENTS

| | | | |
|---|---|---|---|
| 64630 | 11/1982 | European Pat. Off. | 524/69 |
| 10157210 | 10/1985 | European Pat. Off. . | |
| 63-265960 | 11/1988 | European Pat. Off. | 524/145 |
| 3-69376A2 | 5/1990 | European Pat. Off. . | |
| 53-138440 | 12/1978 | Japan | 524/140 |
| 5-423691 | 8/1979 | Japan . | |
| 60-188462 | 9/1985 | Japan . | |
| 61-44922 | 3/1986 | Japan | 524/145 |
| 62-30168 | 2/1987 | Japan | 524/145 |
| 62-218451 | 9/1987 | Japan | 524/145 |
| 4-41799 | 2/1992 | Japan | 524/145 |
| 6-192579 | 7/1994 | Japan . | |
| 6-329919 | 11/1994 | Japan . | |
| 7-157665 | 6/1995 | Japan . | |

*Primary Examiner*—Peter A. Szekely
*Attorney, Agent, or Firm*—Birch, Stewart, Kolasch & Birch, LLP

[57] ABSTRACT

Preparation of an asphalt composition using an asphalt modifier composition comprising at least one member selected from the group consisting of rubber-base modifiers and resin-base modifiers and a phosphorus compound permits the modifier to be satisfactorily dissolved in asphalt. Further, when paving is conducted by using a composition for paving prepared with such the asphalt composition, the adhesion of asphalt to an aggregate is high, and the resultant pavement has markedly improved in rutting resistance and wearing resistance. Therefore, such the pavement has a prolonged service life.

6 Claims, No Drawings

ASPHALT MODIFIER COMPOSITION AND ASPHALT COMPOSITION

This application is a divisional of application Ser. No. 08/807,149 filed on Feb. 27, 1997 now abandoned.

BACKGROUND OF THE INVENTION

1. Field of the Invention

The present invention relates to an asphalt modifier composition comprising a rubber-base modifier and/or a resin-base modifier, and a phosphorus compound, and an asphalt composition prepared by using the same. More particularly, the present invention relates to an asphalt modifier composition in which the solubility of the rubber-base modifier and/or the resin-base modifier contained therein as the main component(s) in asphalt is excellent when mixed with asphalt, and an asphalt composition prepared by using the same, which is excellent in adhesion to an aggregate, and which, when used for executing a pavement, can markedly reduce the formation of rutting and wearing of the pavement and can prolong the service life of the pavement.

2. Description of the Related Art

An asphalt composition for paving comprises asphalt and, in addition, various additives for improving the properties such as weather resistance and temperature dependence of the asphalt. Such the asphalt composition is used for paving in places where conventional petroleum asphalt, when used alone, has no satisfactory function or places where the long-term service life and durability of the pavement are required. Examples of such additives include rubber-base modifiers, such as natural rubber, styrene-butadiene rubber and chloroprene rubber, and resin-base modifiers, such as polyethylene, polypropylene, ethylene-vinyl acetate copolymer, ethylene-ethyl acrylate copolymer and polyesters. They are used alone or as a mixture of two or more of them.

Since, however, these modifiers have poor compatibility with asphalt, the following problems arise.

(1) In order to prepare a homogeneous asphalt composition, a mixture of an asphalt with the modifier must be agitated with heating at a high temperature for a long period of time. As the result, the problem of denaturations of the modifier and the asphalt arises, and the resultant asphalt composition has such disadvantages that designed dynamic stability and toughness tenacity cannot be provided and that a pavement executed by using the asphalt composition suffers from significant wearing. Further, the asphalt is denatured, which deteriorates the dispersibility of asphaltene (n-pentane insolubles) contained in the asphalt and the homogeneity of the asphalt. Thus, a problem of lowering the adhesion of the asphalt to an aggregate arises as well.

(2) The modifier which has been homogeneously dispersed in the asphalt agglomerates during storage under heating, thus causing the modifier to be separated from the asphalt. For example, a styrene-butadiene rubber which is one member of modifiers has a lower specific gravity (about 0.93/15° C.) than the asphalt (specific gravity: about 1.04/15° C.). Therefore, when the separation of the modifier from the asphalt has occurred during storage of the asphalt composition in a storage tank under heating, the modifier is unevenly distributed. As the result, in the upper part of the asphalt composition, the modifier (styrene-butadiene rubber) becomes rich, while in the lower part thereof, the modifier becomes poor. Thus, the asphalt composition includes a part not exhibiting designed various properties. When an asphalt composition which is poor in the modifier content is used for paving, the resultant pavement has very poor rutting resistance and wearing resistance.

In order to solve the above problem, that is, the problem of the separation of the modifier from the asphalt at high temperatures, Japanese Patent Publication-A No. 6-329919 proposes a process comprising using, together with an asphalt, an ester prepared by reacting a copolymer prepared from an ethylenically unsaturated carboxylic acid and an aromatic vinyl compound with a hydroxyl group-containing compound, or a salt of the ester, and Japanese Patent Publication-A No. 7-157665 discloses the utilization of an asphalt modifier comprising an oil-soluble polymer having both an acid group and a basic group.

The adoption of these methods results in somewhat improvement of the properties of the asphalt composition. However, a further improvement in the dispersibility of the modifier, when the asphalt composition is allowed to stand without agitation for a long period of time, has been desired in the art.

Further, it is required that the asphalt is less likely to be stripped from the aggregate for improving the properties of a pavement executed by using an asphalt composition. For this reason, in order to improve the adhesion of the asphalt to the aggregate, Japanese Patent Publication-A No. 60-188462 proposes the addition of a specific acid organo-phosphorus compound to an asphalt, while Japanese Patent Publication-A No. 6-192579 proposes the use of polypropylene or polyethylene modified with maleic anhydride as the modifier.

In recent years, there is a fear of the deterioration in the quality of asphalt, while there is a fear of a good-quality aggregate for paving being exhausted. Therefore, a further improvement in the adhesion of the asphalt to the aggregate has been desired in the art.

DISCLOSURE OF THE INVENTION

Summary of the Invention

An object of the present invention is to provide an asphalt modifier composition which has excellent solubility and dispersibility in asphalt, and can improve the properties of the asphalt such as weather resistance and temperature dependence, and which improves the adhesion of the asphalt to an aggregate and, at the same time, improves the rutting resistance and wearing resistance of the pavement which has been executed by using the modifier composition to be able to prolong the service life of the pavement, and to provide an asphalt composition prepared by using the same.

The present inventors have made extensive studies for improving the above-mentioned problems according to the conventional modifiers. As a result of the studies, they have found that, by using an asphalt modifier composition comprising a specific phosphorus compound and a modifier, the solubility and dispersibility of the modifier in asphalt are improved, the properties of the asphalt such as weather resistance and temperature dependence are improved, the adhesion of the asphalt to the aggregate is improved, and the rutting resistance and wearing resistance of the pavement which has been executed by using the modifier composition are improved. The present invention has been completed based on such the findings.

Thus, the first embodiment of the present invention relates to an asphalt modifier composition comprising at least one member selected from the group consisting of rubber-base modifiers and resin-base modifiers, and a phosphorus compound.

In other words, the first embodiment of the present invention relates to a material for modifying asphalt which comprises a rubber-base and/or a resin-base, characterized by comprising a phosphorus compound.

The asphalt modifier composition of the first embodiment of the present invention is preferably one prepared through the step of mixing at least one member selected from the group consisting of rubber-base modifiers and resin-base modifiers with a phosphorus compound at a temperature of from 50 to 200° C.

It is preferable that in the first embodiment of the present invention, the phosphorus compound is an acid organophosphorus compound represented by the following formula (1), and that the content of the acid organophosphorus compound is 0.1 to 30% by weight based on the total weight of the at least one member selected from the group consisting of rubber-base modifiers and resin-base modifiers, and the acid organophosphorus compound:

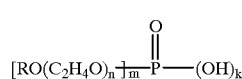
(1)

wherein R represents a saturated or unsaturated aliphatic hydrocarbon group having 8 to 36 carbon atoms or an alkylphenyl group having 6 to 26 carbon atoms in total; m is 1 or 2 and k is 1 or 2, provided that the sum of m and k is 3; and the product of m and n, which represents the average number of ethylene oxide molecules added per molecule, is 0 to 20.

The acid organophosphorus compound represented by the above formula (1) includes compounds represented by the following formula (1a):

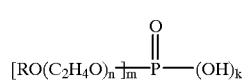
(1a)

wherein R represents a saturated or unsaturated aliphatic hydrocarbon having 8 to 36 carbon atoms or an alkylphenyl group having 6 to 26 carbon atoms in total; m represents an integer of 1 to 2; n represents an integer of 0 to 10; k represents an integer of 1 to 2; and the sum of m and k is 3.

The second embodiment of the present invention relates to an asphalt composition comprising an asphalt and the above-mentioned asphalt modifier composition of the first embodiment of the present invention, wherein the content of the asphalt modifier composition is 0.1 to 30% by weight based on the weight of the asphalt.

In other words, the second embodiment of the present invention relates to an asphalt composition prepared by blending the above-mentioned material for modification according to the first embodiment of the present invention in an amount of 0.1 to 30% by weight with the asphalt.

The third embodiment of the present invention relates to a process for preparing an asphalt composition, which comprises mixing, preferably melt-mixing, the asphalt modifier composition of the first embodiment of the present invention which is prepared through the step of mixing at least one member selected from the group consisting of rubber-base modifiers and resin-base modifiers with a phosphorus compound at a temperature of from 50 to 200° C., with an asphalt.

Further scope and applicability of the present invention will become apparent from the following detailed description and examples. However, it should be understood that the detailed description and specific examples, while indicating preferred embodiments of the present invention, are given by way of illustration only, since various changes and modifications within the spirit and scope of the present invention will become apparent to those skilled in the art from this detailed description and these examples.

DETAILED DESCRIPTION OF THE INVENTION

The asphalt modifier composition of the present invention comprises a rubber-base modifier and/or a resin-base modifier, and a phosphorus compound.

Examples of the rubber-base modifiers usable in the present invention include natural rubber (NR), and synthetic rubbers such as styrene-butadiene rubber (SBR), styrene-butadiene-styrene rubber (SBS), styrene-isoprene rubber (SIR) and chloroprene rubber (CR). Among them, block copolymers of aromatic compound monomers each having a vinyl group with conjugate diene compound monomers are thermoplastic rubbers, and are preferred from the viewpoint of the solubility in asphalt.

Examples of the aromatic compound monomers each having a vinyl group, which are starting materials for the block copolymers described above, include monomers such as styrene, p-methylstyrene, tert-butylstyrenes, α-methylstyrene and 1,1-diphenylethylene. Among them, styrene is preferred from the viewpoints of cost and reactivity. One member alone among these monomers, or two or more of them is(are) used as the starting material(s) for the above-mentioned block copolymers.

While, examples of the conjugate diene compound monomers include monomers such as 1,3-butadiene, isoprene, 2,3-dimethyl-1,3-butadiene and 1-phenyl-1,3-butadiene. Among them, 1,3-butadiene and isoprene are preferred from the viewpoints of cost and reactivity. One member alone among these monomers, or two or more of them is(are) used as the starting material(s) for the above-mentioned block copolymers.

Among the above-mentioned block copolymers, styrene-butadiene-styrene rubber (SBS) and styrene-isoprene-styrene rubber (SIS) are preferred, and SBS is most preferred.

The thermoplastic block copolymer may be prepared by, for example, a process comprising first polymerizing an aromatic compound monomer having a vinyl group with the use of an organolithium compound or the like as the polymerization initiator in an inert hydrocarbon solvent, then copolymerizing a conjugate diene compound monomer therewith, and thereafter repeatedly subjecting the aromatic compound monomer having a vinyl group and the conjugate diene compound monomer to block copolymerization. The polymerization temperature in such the reaction is not particularly limited. In usual, however, it is preferably in the range of from 20 to 130° C. when the productivity is taking into consideration. Still more preferably, the polymerization initiation temperature is in the range of from 30 to 90° C., and the maximum attainable temperature during polymerization and aging is in the range of from 80 to 120° C.

Examples of inert hydrocarbon solvents usable in the reaction include cyclohexane, n-hexane, benzene, toluene, xylene and octane, and mixtures of two or more of them. Among them, cyclohexane is preferred.

While, resin-base modifiers usable in the present invention include polyethylene, polypropylene, polystyrene, polycarbonate, ethylene-vinyl acetate copolymer (EVA), ethylene-ethyl acrylate copolymer (EEA), ethylene-propylene copolymer, polyurethane, acrylic ester copolymers, styrene-acrylic ester copolymers, polyester resin and petroleum resin and, in addition, thermosetting resins such as phenol-aldehyde copolymers and epoxy resins. Among them, ethylene-vinyl acetate copolymer and ethylene-ethyl acrylate copolymer are preferred because an asphalt composition containing any of such the modifiers has large flow resistance.

Further, in the present invention, voluntary mixtures of a rubber-base modifier and a resin-base modifier may be used as the asphalt modifier. Among them, a mixture of SBS and EEA, a mixture of SBS and EVA, a mixture of SIS and EEA, and a mixture of SIS and EVA are preferred, because the asphalt composition containing any of such the mixtures is superior in properties such as adhesion to an aggregate, weather resistance and temperature dependence, and the pavement executed with such the asphalt composition is excellent in rutting resistance and wearing resistance.

The phosphorus compound according to the present invention may be any of organophosphorus compounds and inorganic phosphorus compounds, and is not particularly limited. However, organophosphorus compounds are preferred from the viewpoints of dispersibility in the rubber-base modifier and/or the resin-base modifier, and the homogeneity of the resultant modifier composition.

Examples of the inorganic phosphorus compounds usable in the present invention include phosphoric anhydride ($P_2O_5$), polyphosphoric acid, orthophosphoric acid, phosphorus oxytrichloride ($POCl_3$), phosphorus trichloride ($PCl_3$) and phosphorus pentasulfide ($P_2S_5$) The use of phosphoric anhydride, polyphosphoric acid, or orthophosphoric acid is preferred particularly from the viewpoint of handleability.

One embodiment of the asphalt modifier compositions of the present invention comprises the modifier and the inorganic phosphorus compound described above, and the content of the inorganic phosphorus compound is 0.1 to 10% by weight based on 100% by weight in total of the modifier and the inorganic phosphorus compound. An asphalt composition comprising an asphalt modifier composition containing 0.1 to 10% by weight of the inorganic phosphorus compound has higher adhesion to an aggregate than an asphalt composition not containing any inorganic phosphorus compound. Thus, it is preferable that the asphalt modifier composition of the present invention contains the above-mentioned inorganic phosphorus compound in an amount of 0.1% by weight or more from the viewpoint of improving the adhesion of the asphalt composition to the aggregate. While from the viewpoint of the homogeneity of the asphalt modifier composition, it is preferable that the composition contains the inorganic phosphorus compound in an amount of 10% by weight or less. The content of the inorganic phosphorus compound in the asphalt modifier composition is preferably 0.5 to 5% by weight, and still more preferably 1 to 5% by weight.

The reason why the asphalt modifier composition containing the inorganic phosphorus compound according to the present invention has excellent adhesion to an aggregate is presumably as follows. It is known that the inorganic phosphorus compound contained in the asphalt modifier composition of the present invention is used as a catalyst in the production of a blown asphalt and contributes to the formation of a developed network structure (see Japanese Patent Publication-B No. 54-23691). Similarly, the inorganic phosphorus compound functions as a crosslinking agent between the rubber-base modifier and/or the resin-base modifier, and a higher order network structure (asphaltene) in the asphalt, and is useful to strengthen the gel structure in the asphalt. By virtue of this, the asphalt composition containing an inorganic phosphorus compound has high adhesion to an aggregate and good resistance to stripping from the aggregate. However, when the inorganic phosphorus compound and the rubber-base modifier and/or the resin-base modifier are separately melt-mixed with the asphalt, the above effect can not be satisfactorily exhibited because the inorganic phosphorus compound has poor dispersibility in the asphalt.

Another embodiment of the asphalt modifier composition of the present invention is prepared from the modifier described above, and an inorganic phosphorus compound and a compound having a hydroxyl group capable of bonding to the inorganic phosphorus compound.

The compound having a hydroxyl group capable of bonding to the inorganic phosphorus compound according to the present invention may be a low-molecular weight compound or a high-molecular weight compound, and is not particularly limited.

Examples of the low-molecular weight compounds usable herein include aliphatic alcohols such as 2-ethylhexyl alcohol, decyl alcohol, lauryl alcohol, myristyl alcohol, cetyl alcohol, stearyl alcohol, isostearyl alcohol, oleyl alcohol and arachidyl alcohol; alkylphenols such as octylphenol and nonylphenol; synthetic alcohols synthesized by the oxo process, the Ziegler process, the Guerbet process or the like; adducts of the above alcohols and alkylphenols with an alkylene oxide(s), preferably ethylene oxide and/or propylene oxide, wherein the (total) amount of the alkylene oxide(s) is 1 to 10 moles per mole of the alcohol (or alkylphenol); diols such as ethylene glycol, diethylene glycol, triethylene glycol, 1,2-propylene glycol, 1,3-propylene glycol, 1,4-butanediol, neopentyl glycol, 1,4-butenediol, 1,5-pentanediol and 1,6-hexanediol; etherified bisphenols such as bisphenol A, hydrogenated bisphenol A, polyoxyethylenated bisphenol A and polyoxypropylenated bisphenol A; dihydric alcohols other than bisphenols; and trihydric or higher alcohols such as sorbitol, 1,2,3,6-hexanetetraol, 1,4-sorbitan, pentaerythritol, dipenta-erythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane and 1,3,5-trihydroxybenzene; and mixtures of two or more of the above low-molecular weight compounds. Among them, those having a large number of carbon atoms are preferred from the viewpoints of the solubility and dispersibility in the asphalt modifier, and those having 16 or more carbon atoms are particularly preferred from the viewpoint of the adhesion of the asphalt composition to an aggregate.

Examples of high-molecular weight compounds usable herein include polyethylene glycol, polypropylene glycol, polyvinyl alcohol, a polyester polyol prepared by the polycondensation of a dihydric alcohol with a dibasic acid component, cellulose and its derivatives, and epoxy resins, and mixtures of two or more of the above high molecular weight compounds. Among these high-molecular weight compounds, those having a molecular weight of 10000 or less, particularly 5000 or less, are preferred from the viewpoint of the bondability to, i.e., the reactivity with, the inorganic phosphorus compound.

The compound having a hydroxyl group capable of bonding to the inorganic phosphorus compound according to the present invention is considered to play the following role.

When the asphalt modifier composition of the present invention contains an inorganic phosphorus compound as the phosphorus compound, the adhesion of an asphalt composition prepared by using such the modifier composition to an aggregate and the resistance thereof to stripping from the aggregate are higher than those in the case of an asphalt composition not containing any phosphorus compound. However, the asphalt is an organic material, and the affinity of an organic compound for the asphalt is higher than that of an inorganic compound for the asphalt. Therefore, when an inorganic phosphorus compound is reacted with a compound having a hydroxyl group capable of bonding to the inorganic phosphorus compound in the preparation process of the asphalt modifier composition, an organophosphorus compound having higher affinity for asphalt can be obtained. Since such the organophosphorus compound has excellent dispersibility in asphalt, the properties inherent in the phosphorus compound can be satisfactorily exhibited in an asphalt composition prepared by using such the asphalt modifier composition according to the present invention.

The inorganic phosphorus compound and the compound having a hydroxyl group capable of bonding to the inorganic phosphorus compound are incorporated into the modifier in the system of the asphalt modifier composition, and are given an opportunity for bonding at a high frequency. That is, both the compounds are reacted with each other in the system of the asphalt modifier composition at a high reaction efficiency.

During the preparation of the modifier composition according to the present invention, the inorganic phosphorus compound and the compound having a hydroxyl group capable of bonding to the inorganic phosphorus compound are not always completely reacted with each other. Further, under some preparation conditions, the inorganic phosphorus compound and the compound having a hydroxyl group capable of bonding to the inorganic phosphorus compound are present as they are in the modifier composition. Therefore, the modifier composition prepared by using the inorganic phosphorus compound and the compound having a hydroxyl group capable of bonding to the inorganic compound includes the following embodiments: (1) a modifier composition comprising a modifier, an inorganic phosphorus compound, and a compound having a hydroxyl group capable of bonding to the inorganic phosphorus compound; (2) a modifier composition comprising a modifier and an organophosphorus compound which is a product of a reaction of an inorganic phosphorus compound with a compound having a hydroxyl group capable of bonding to the inorganic compound; and (3) a modifier composition comprising a modifier, an inorganic phosphorus compound, a compound having a hydroxyl group capable of bonding to the inorganic phosphorus compound, and an organophosphorus compound which is a product of a reaction of the inorganic phosphorus compound with the compound having a hydroxyl group capable of bonding to the inorganic phosphorus compound.

In the case of the above modifier composition (1), it is preferred that the content of the inorganic phosphorus compound and the content of the compound having a hydroxyl group capable of bonding to the inorganic compound are respectively 0.1 to 10% by weight and 0.1 to 30% by weight, based on 100% by weight in total of the modifier, the inorganic phosphorus compound, and the compound having a hydroxyl group capable of bonding to the inorganic phosphorus compound. Preferably, the compound having a hydroxyl group capable of bonding to the inorganic phosphorus compound is contained in an amount of 0.1% by weight or more in the modifier composition, from the viewpoint of the adhesion of an asphalt composition prepared by using the modifier composition containing this compound to an aggregate, while it is contained in an amount of 30% by weight or less in the modifier composition, from the viewpoint of homogeneous mixing of the compound having a hydroxyl group capable of bonding to the inorganic phosphorus compound with the modifier. The content of the compound having a hydroxyl group capable of bonding to the inorganic phosphorus compound is still more preferably 0.5 to 20% by weight, particularly preferably 1 to 20% by weight.

Even when the modifier composition (1) is used, mixing of the modifier composition (1) with asphalt under some conditions results in the formation of an organophosphorus compound which is a product of a reaction of the inorganic phosphorus compound with the compound having a hydroxyl group capable of bonding to the inorganic phosphorus compound, and, therefore, the asphalt composition thus prepared may contain the organophosphorus compound described above in such the case.

It is preferable that the modifier composition according to the present invention comprises an acid organophosphorus compound represented by the following formula (1):

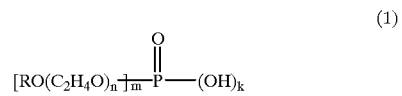

(1)

wherein R represents a saturated or unsaturated aliphatic hydrocarbon group having 8 to 36 carbon atoms or an alkylphenyl group having 6 to 26 carbon atoms in total; m is 1 or 2 and k is 1 or 2, provided that the sum of m and k is 3; and the product of m and n, which represents the average number of ethylene oxide molecules added per molecule, is 0 to 20, with n being preferably an integer of 0 to 10.

The acid organophosphorus compound can be easily prepared on an industrial scale by an usually known method. Further, the above product of a reaction of an inorganic phosphorus compound with a compound having a hydroxyl group capable of bonding to the inorganic phosphorus compound may have, in some cases, a chemical formula represented by the above formula (1).

The acid organophosphorus compound represented by the formula (1) is prepared, for example, by the reaction of phosphoric anhydride ($P_2O_5$), polyphosphoric acid, phosphorus oxytrichloride ($POCl_3$), phosphorus trichloride ($PCl_3$) or phosphorus pentasulfide ($P_2S_5$) with a hydroxyl compound represented by the formula: RO $(C_2H_4O)_nH$.

When the acid organophosphorus compound may have a structure represented by the formula: —P(=O)—H in some cases, and it is needless to say that such the tautomer having the above structure is also included in the scope of the organophosphorus compounds of the present invention.

When phosphoric anhydride ($P_2O_5$) is used as the starting material, the reaction scheme is represented as follows and the reaction product usually becomes a mixture of a monoester and a diester:

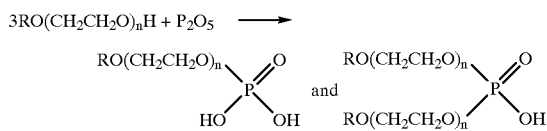

In the present invention, any of a monoester, a diester and a mixture of a monoester and a diester may be used as the acid organophosphorus compound. However, the use of an acid organophosphorus compound having a content of a monoester of 40% by mole or more is preferred from the viewpoints of the solubility and dispersibility of the asphalt modifier composition containing the acid organophosphorus compound in the asphalt. The content of the monoester of the acid organophosphorus compound is more preferably 60% by mole or more, particularly preferably 60 to 90% by mole, and most preferably about 80% by mole.

Examples of the hydroxyl compounds usable as the starting material in the preparation of the compound represented by the above formula (1) include the low-molecular weight compounds and the high-molecular weight compounds described above as examples of the compounds having a hydroxyl group capable of bonding to the inorganic phosphorus compound. Among the low-molecular weight compounds, those having a large number of carbon atoms are preferred from the viewpoints of the solubility and dispersibility in the asphalt, and those having 16 or more carbon atoms are particularly preferred from the viewpoint of the adhesion of the asphalt composition to an aggregate. Among the high-molecular weight compounds, those having a molecular weight of 10000 or less, particularly 5000 or less, are preferred from the viewpoint of the bondability to, i.e., the reactivity with, the inorganic phosphorus compound as the starting material.

When the asphalt modifier composition of the present invention contains the acid organophosphorus compound in an amount of 0.1 to 30% by weight based on 100% by weight in total of the modifier and the above acid organophosphorus compound, such the asphalt modifier composition has excellent solubility and dispersibility in the asphalt and an asphalt composition prepared by using such the modifier composition has excellent adhesion to an aggregate. The asphalt modifier composition preferably contains the above acid organophosphorus compound in an amount of 0.1% by weight or more from the viewpoint of the solubility and dispersibility of the asphalt modifier composition in the asphalt. While, the content of the acid organophosphorus compound is preferably 30% by weight or less from the viewpoint of homogeneous mixing of the modifier with the acid organophosphorus compound. The content of the acid organophosphorus compound is more preferably 0.5 to 20% by weight, particularly preferably 1 to 20% by weight.

The reason why the asphalt modifier composition containing the acid organophosphorus compound according to the present invention has excellent solubility and dispersibility in asphalt is presumably as follows. The acid organophosphorus compound contained in the asphalt modifier composition of the present invention has both a polar group and a nonpolar group in its molecule, and hence serves in the asphalt as a compatibilizer (dispersant for dispersing in oil), i.e., has the effect of homogeneously dispersing the rubber-base modifier and/or the resin-base modifier in the asphalt. In this case, previous homogeneous mixing of the acid organophosphorus compound with the above modifier offers better effect. Mixing of the acid organophosphorus compound with the above modifier on a molecular level is ideal. However, the above effect can be exhibited even when the acid organophosphorus compound and the modifier are in a state of phase separation. Meanwhile, it is known that the phosphorus compound is used as a catalyst in the production of a blown asphalt and contributes to the formation of a developed network structure. Similarly, the phosphorus compound is considered to function as a crosslinking agent between the rubber-base modifier and/or the resin-base modifier, and a higher order network structure (asphaltene) in the asphalt. However, when the acid organophosphorus compound and the rubber-base modifier and/or the resin-base modifier are separately melt-mixed with the asphalt, the effect of the acid organophosphorus compound as the crosslinking agent is low. The reason why the presence of the acid organophosphorus compound results in an improved adhesion of the asphalt composition to an aggregate is considered in that, since the acid organophosphorus compound has the above structure, it acts on the interface between the asphalt composition and the aggregate.

The asphalt modifier composition of the present invention is prepared by mixing a phosphorus compound with the above modifier. Mixing methods are not particularly limited, but any method is usable. For example, the modifier composition can be prepared by mixing the above phosphorus compound with the above modifier by means of a heat-melting oven, a roll kneader, a Banbury mixer, a kneader-extruder or the like. Alternatively, the modifier composition can be prepared by adding the phosphorus compound in a heat-melted state or as a solution thereof in a solvent before and/or after the preparation of the above modifier thereto, that is, to the starting material composition for the modifier and/or the modifier, followed by mixing therewith.

Among the mixing methods described above, a method comprising adding an acid organophosphorus compound to a commercially available or prepared modifier in a heat-melted state and mixing therewith, and a method comprising adding, after the preparation of a modifier, an inorganic phosphorus compound and a compound having a hydroxyl group capable of bonding to the inorganic phosphorus compound, which are starting materials for an acid organophosphorus compound, to the modifier, and preparing the acid organophosphorus compound and, at the same time, mixing the modifier with the phosphorus compound, are preferred from the viewpoint of homogeneous mixing and productivity.

The mixing is preferably conducted at a temperature of 50 to 200° C. When the mixing is conducted at a temperature within the above range, a homogeneous mixture of the modifier and the phosphorus compound can be obtained.

The asphalt composition of the present invention comprises an asphalt and the modifier composition of the present invention, and the content of the asphalt modifier composition is 0.1 to 30% by weight based on the weight of the asphalt. When the asphalt modifier composition is used in an amount within the above range, the resultant asphalt composition has excellent properties such as weather resistance and temperature dependence, and excellent adhesion to an aggregate, and a pavement executed by using the asphalt composition exhibits excellent rutting resistance and wearing resistance. Hence, the pavement has a prolonged service life. In order to attain the above various effects, the asphalt modifier composition is used in an amount of 0.1% by weight or more based on the weight of the asphalt, while it is used in an amount of 30% by weight or less from the viewpoint of the compatibility thereof with the asphalt. The asphalt modifier composition is used in an amount of preferably 0.5 to 20% by weight, still more preferably 1 to 10% by weight.

The asphalt to be used in the present invention is a mixture composed mainly of hydrocarbons, called "bituminous material", and specific examples thereof include petroleum asphalts such as straight asphalt, semi-blown asphalt, blown asphalt and cutback asphalt; and natural asphalt. In the present invention, one member among them may be used, or two or more of them may be used. Further, deteriorated asphalt (in general, asphalt having a low penetration due to the migration of the maltene fraction in the asphalt to asphaltene) recovered from waste pavement and the like are also usable. Furthermore, an asphalt composition comprising an asphalt regenerating additive for restoring the lowered penetration of the asphalt to the penetration equivalent to that of fresh asphalt [specified in "Puranto Saisei Hosou Gijutsu Shishin" (published by Japan Road Association)] is also usable. As the asphalt regenerating additive, the modifier composition of the present invention can also be used.

The asphalt composition of the present invention is prepared by mixing the asphalt modifier composition of the present invention with an asphalt. The method for mixing the asphalt modifier composition with the asphalt is not particularly restricted, and any method can be applied. Specifically, an asphalt composition can be prepared by, if desired, mixing, preferably melt-mixing, the asphalt modifier composition described above with the asphalt by means of, for example, a heat-melting oven, a roll kneader, a Banbury mixer, a kneader-extruder or the like.

The asphalt composition thus prepared may optionally contain, if necessary, various additives commonly used for the conventional asphalt compositions, for example, fillers and auxiliary agents such as silica, talc, calcium carbonate, mineral powders, glass fibers and cellulose fibers, reinforcements, mineral aggregates, pigments, softening agents such as process oils, and foaming agents such as azodicarbonamides.

When the use of the asphalt composition as the material for road paving is contemplated, the asphalt composition is usually used in the form of a mixture thereof with an aggregate such as mineral stone, sand, slag cement and hydrated lime. If necessary, such the mixture (i.e., composition for paving) may further contain an amine-, amide-, or phosphate-base antistripping agent or the like for the purpose of preventing the stripping of the asphalt composition from the aggregate.

The asphalt composition prepared by using the asphalt modifier composition of the present invention has excellent adhesion to an aggregate and an antistripping property, and can satisfy various properties required in the market. Accordingly, the asphalt composition of the present invention can be utilized as the material for road paving, a roofing material, and an underground protective material for vehicles, which are used in construction for waterproofing.

EXAMPLES

The present invention will now be described in more detail with reference to the following Examples, though the Examples should not be considered as limiting the scope of the invention.

Example 1

The acid organophosphorus compounds listed in Table 1 and a commercially available styrene-butadiene rubber (SBR) (entire styrene content: 25% by weight, weight-average molecular weight: 350,000) were weighed at the ratios specified in Table 1, followed by mixing. The resultant mixtures were kneaded by means of an 8-inches roll kneader under the conditions of the number of revolutions of 15 rpm, the temperature of 200° C., and the mixing time of 10 min to prepare asphalt modifier compositions.

TABLE 1

| No. | Acid organophosphorus compd. (numerical values within parentheses represent molar ratios) | Mixing ratio (by wt.) organo- phosphorus compd./SER |
|---|---|---|
| No. 1 | Monostearyl phosphate | 2/98 |
| No. 2 | Distearyl phosphate | 10/90 |
| No. 3 | Mixture of monostearyl phosphate and distearyl phosphate (1/1) | 5/95 |
| No. 4 | Mixture of monostearyl phosphate and distearyl phosphate (3/7) | 3/97 |
| No. 5 | Mixture of monostearyl phosphate and distearyl phosphate (7/3) | 3/97 |
| No. 6 | Mixture of monooleyl phosphate and dioleyl phosphate (7/3) | 5/95 |
| No. 7 | Mixture of monocetyl phosphate and dicetyl phosphate (7/3) | 5/95 |
| No. 8 | Phosphoric esters of Guerbet's alcohol (no. of carbon atoms: 32) (mono/di = 7/3) | 10/90 |
| No. 9 | Phosphoric esters of polyoxyethylene (5 mol) nonylphenyl ether (mono/di = 1/1) | 10/90 |
| No. 10 | Phosphoric esters of ethylene oxide (2 mol) adduct of laurylamine(mono/di = 1/1) | 10/90 |
| No. 11 | Phosphoric esters of polyoxypropylene (8 mol) butylphenyl ether (mono/di = 1/1) | 10/90 |

Example 2

The acid organophosphorus compounds listed in Table 2 and a commercially available styrene-butadiene-styrene block copolymer (SBS) (Solprene 406, manufactured by Asahi Chemical Industries Co., Ltd.) were weighed at the ratios specified in Table 2, followed by mixing. The resultant mixtures were agitated and mixed at 50° C. in the presence of a solvent (a xylene/tetrahydrofuran (7/3) mixed solvent) After mixing, the temperature of the mixtures was raised to remove the solvent by distillation. Thus, asphalt modifier compositions were prepared.

Example 3

Air in a 5-liter stainless steel reactor equipped with an agitator was thoroughly purged with nitrogen. Thereafter, 2000 g of cyclohexane, 5 g of tetrahydrofuran, and 80 g of styrene were fed into the reactor, and the temperature was brought to 65° C. Subsequently, a solution of n-butyllithium in cyclohexane [net weight (amount of n-butyllithium): 0.3 g] was fed into the reactor to initiate polymerization of styrene. After styrene was substantially completely polymerized, 240 g of butadiene was added to the reaction mixture and the polymerization was continued.

TABLE 2

| No. | Acid organophosphorus compd. (numerical values within parentheses represent molar ratios) | Mixing ratio (by wt.) organo- phosphorus compd./SBS |
|---|---|---|
| No. 1 | Monostearyl phosphate | 1/99 |
| No. 2 | Distearyl phosphate | 10/90 |

TABLE 2-continued

| No. | Acid organophosphorus compd. (numerical values within parentheses represent molar ratios) | Mixing ratio (by wt.) organo-phosphorus compd./SBS |
|---|---|---|
| No. 3 | Mixture of monostearyl phosphate and distearyl phosphate (1/1) | 5/95 |
| No. 4 | Mixture of monostearyl phosphate and distearyl phosphate (3/7) | 3/97 |
| No. 5 | Mixture of monostearyl phosphate and distearyl phosphate (7/3) | 3/97 |
| No. 6 | Mixture of monooleyl phosphate and dioleyl phosphate (7/3) | 5/95 |
| No. 7 | Mixture of monocetyl phosphate and dicetyl phosphate (7/3) | 5/95 |
| No. 8 | Phosphoric esters of Guerbet's alcohol (no. of carbon atoms: 32) (mono/di = 7/3) | 5/95 |
| No. 9 | Phosphoric esters of polyoxyethylene (5 mol) nonylphenyl ether (mono/di = 1/1) | 5/95 |
| No. 10 | Phosphoric esters of ethylene oxide (2 mol) adduct of laurylamine(mono/di = 1/1) | 5/95 |
| No. 11 | Phosphoric esters of polyoxypropylene (8 mol) butylphenyl ether (mono/di = 1/1) | 5/95 |

The reaction temperature at this time was 90° C. After the reaction of butadiene was completed, the reaction mixture thus obtained was aged, i.e., held, at 90° C. for about 15 minutes. Thereafter, styrene in the same amount as that previously used was added to the resultant reaction mixture, and the polymerization was continued. After styrene was substantially completely polymerized, 1 g of water was added to the reaction mixture. The water was homogeneously dispersed in the system to completely deactivate the polymerization active species. Subsequently, 8.16 g of each of the acidic organophosphorus compounds specified in Table 3 (styrene-butadiene-styrene block copolymer: acid organophosphorus compound=98% by weight: 2% by weight) was added to the reaction mixture thus obtained, and the resultant mixture was agitated. At this time, the temperature was 90° C.

Each resultant mixture (polymer solution) was withdrawn from the reactor and subjected to steam topping to remove the solvent. Continuously, the obtained mixture was dried (temperature: 150° C.) by dehydration by means of an extruder kneader. Thus, mixtures of a styrene-butadiene-styrene block copolymer with acid organophosphorus compounds were prepared.

As the result of analysis, it has been found that the entire styrene content of the styrene-butadiene-styrene block copolymer was 38%. The entire styrene content was calculated from the absorption intensity at 262 nm determined with ultraviolet spectro-photometer (UV 200, manufactured by Hitachi Co., Lid.).

The acid organophosphorus compounds were each homogeneously dispersed in the block copolymer. P (phosphorus) in each of the mixtures was quantitatively analyzed with inductively coupled plasma (ICP) emission spectrometer (SPS 1100H, manufactured by Seiko Electronic Industries Ltd.). As the result, it has found that the contents of the acid organophosphorus compounds were each in the range of from 2.0 to 2.2% by weight. The reason why the contents of the acid organophosphorus compounds became high, as compared with those at feed, is in that the yield of the copolymer was not 100%.

TABLE 3

| No. 1 | Monostearyl phosphate |
|---|---|
| No. 2 | Distearyl phosphate |
| No. 3 | Mixture of monostearyl phosphate and distearylphosphate (1/1)* |
| No. 4 | Mixture of monostearyl phosphate and distearyl phosphate (3/7)* |
| No. 5 | Mixture of monostearyl phosphate and distearyl phosphate (7/3)* |
| No. 6 | Mixture of monostearyl phosphate and distearyl phosphate (8/2)* |
| No. 7 | Mixture of monooleyl phosphate and dioleyl phosphate (7/3)* |
| No. 6 | Mixture of monooleyl phosphate and dioleyl phosphate (8/2)* |
| No. 7 | Mixture of monocoleyl phosphate and dioleyl phosphate (7/3)* |
| No. 8 | Mixture of monooleyl phosphate and dioleyl phosphate (8/2)* |
| No. 9 | Mixture of monocetyl phosphate and dicetyl phosphate (7/3)* |
| No. 10 | Mixture of monocetyl phosphate and dicetyl phosphate (8/2)* |
| No. 11 | Phosphoric esters of Guerbet's alcohol (number of carbon atoms: 32) (mono/di = 7/3)* |
| No. 12 | Phosphoric esters of Guerbet's alcohol (number of carbon atoms: 32) (mono/di = 8/2)* |
| No. 13 | Phosphoric esters of polyoxyethylene (5 mol) nonylphenyl ether (mono/di = 1/1)* |
| No. 14 | Phosphoric esters of ethylene oxide (2 mol) adduct of laurylamine (mono/di = 1/1)* |
| No. 15 | Phosphoric esters of polyoxypropylene (8 mol) butylphenyl ether (mono/di = 1/1)* |

*: Numerical values within parentheses represent molar ratios.

Example 4

The acid organophosphorus compounds listed in Table 1 and a commercially available ethylene-vinyl acetate copolymer (EVA) (Evaflex 210, manufactured by Du Pont-Mistui Polychemicals Co., Ltd.) were weighed at the ratios specified in Table 1, followed by mixing. The resultant mixtures were kneaded by means of an 8-inches roll kneader under the conditions of the number of revolutions of 15 rpm, the temperature of 150° C., and the mixing time of 10 min to prepare asphalt modifier compositions.

Example 5 and Comparative Examples 1 to 20

50 g of each of the asphalt modifier compositions prepared in Examples 1 to 4 was melt-mixed with 1000 g of straight asphalt (penetration 60/80) in a 2-liter hot-melting oven for 90 minutes at 180° C. Thus, the asphalt compositions of the present invention were prepared.

For comparison, the copolymer alone used in any of Examples 1 to 4 (i.e., not adding any acid organophosphorus compound) was used instead of the asphalt modifier composition of the present invention. Thus, asphalt compositions (Comparative Examples 1, 6, 11, and 16) were prepared.

Further, for comparison, the copolymer alone used in any of Examples 1 to 4 was melt-kneaded with the asphalt for 90 minutes at 180° C., and then the acid organophosphorus compound was added to the resultant mixture, followed by mixing. Thus, asphalt compositions (Comparative Examples 2, 4, 7, 9, 12, 14, 17, and 19) were prepared.

While, asphalt compositions (Comparative Example 3, 5, 8, 10, 13, 15, 18, and 20) were prepared in the same manner as that described above, except that the order of addition of the copolymer and the acid organophosphorus compound was reversed.

These asphalt compositions were evaluated by the following methods.

<Evaluation Methods>

(Compatibility, Dispersibility, and Solubility)

For evaluating the compatibility of asphalt with the asphalt modifier compositions prepared in Examples 1 to 4 and the dispersibility and solubility of the modifier compositions in asphalt, the asphalt compositions of the present invention and the comparative asphalt compositions, as prepared above, were stored at a high temperature. Specifically, 1000 g of the sample (asphalt composition) was placed in a cylindrical container having an inner diameter of 80 mm and allowed to stand at 180° C. for 5 hours in an open system. Thereafter, a part of the uppermost portion in the asphalt composition was placed on a slide glass, cooled, and then observed under an optical microscope to measure the domain diameter of the modifier (copolymer) in the asphalt.

Usually, an asphalt modifier has a lower specific gravity than asphalt. When therefore the compatibility of the asphalt modifier with the asphalt or the dispersibility and solubility of the asphalt modifier in the asphalt is poor, the asphalt composition causes phase separation during standing, resulting in agglomeration of the asphalt modifier on the upper part of the asphalt composition, whereby the domain diameter of the modifier is increased. Thus the compatibility of the asphalt modifier with the asphalt or the dispersibility and solubility of the asphalt modifier in the asphalt can be evaluated by observing the asphalt composition after standing.

In this case, when even one modifier domain having a diameter of 100 μm or more was observed, the asphalt modifier composition was evaluated as X; when even one modifier domain having a diameter of 50 to 100 μm was observed, the asphalt modifier composition was evaluated as Δ; and when the diameters of all the modifier domains do not exceed 50 μm, the asphalt modifier composition was evaluated as O.

(Toughness and Tenacity Tests)

Toughness and tenacity values most directly represent the properties of asphalt compositions containing a rubber and/or a resin. More specifically, the toughness represents the force of the asphalt grasping an aggregate (i.e., resistance to pull-out, cohesive force) at ordinary temperatures, while the tenacity represents the force resistant to externally applied large deformation pressure (i.e., caking property).

The test sample was prepared by allowing 1000 g of the asphalt composition to stand in a cylindrical container having an inner diameter of 80 mm at 180° C. for 5 hours in an open system, removing 800 g of the composition from the upper part of the composition, and taking the same from the residue (200 g) of the composition.

The test was conducted according to the method described in JEAAS (Japanese Emulsified Asphalt Association Standard).

An asphalt composition containing a modifier having poor compatibility, dispersibility and solubility causes phase separation during standing, and the modifier is unevenly distributed and agglomerates on the upper part of the asphalt composition. As a result, the asphalt composition present in the lower part after standing is poor in the modifier content. Such an asphalt composition has low toughness and tenacity.

Evaluation results are given in Tables 4 to 7.

TABLE 4

| | Modifiers and modifier compns. used, and prepn. methods for asphalt compns. | Compatibility, dispersibility, and solubility | Toughness (25° C.) kgf · cm | Tenacity (25° C.) kgf · cm |
|---|---|---|---|---|
| Ex. | Ex. 1 - No. 1 | o | 184 | 136 |
| | Ex. 1 - No. 2 | o | 163 | 121 |
| | Ex. 1 - No. 3 | o | 187 | 140 |
| | Ex. 1 - No. 4 | o | 189 | 139 |
| | Ex. 1 - No. 5 | o | 191 | 137 |
| | Ex. 1 - No. 6 | o | 185 | 139 |
| | Ex. 1 - No. 7 | o | 187 | 140 |
| | Ex. 1 - No. 8 | o | 169 | 120 |
| | Ex. 1 - No. 9 | o | 166 | 123 |
| | Ex. 1 - No. 10 | o | 165 | 122 |
| | Ex. 1 - No. 11 | o | 168 | 116 |
| Comp. Ex. 1 | SBR alone used in Ex. 1 | x | 97 | 43 |
| Comp. Ex. 2 | SBR alone used in Ex. 1 was mixed with asphalt, followed by adding organo-phosphorus compd. No. 1 to the resultant mixture and mixing therewith. | Δ | 142 | 109 |
| Comp. Ex. 3 | Organophosphorus compd. and SBR were used in the reverse order of Comp. Ex. 2. | Δ | 151 | 110 |
| Comp. Ex. 4 | SBR alone used in Ex. 1 was mixed with asphalt, followed by adding organo-phosphorus compd. No. 2 to the resultant mixture and mixing therewith. | Δ | 117 | 74 |
| Comp. Ex. 5 | Organophosphorus compd. and SBR were used in the reverse order of Comp. Ex. 4. | Δ | 121 | 75 |

TABLE 5

| | Modifiers and modifier compns. used, and prepn. methods for asphalt compns. | Compatibility, dispersibility, and solubility | Toughness (25° C.) kgf · cm | Tenacity (25° C.) kgf · cm |
|---|---|---|---|---|
| Ex. | Ex. 2 - No. 1 | o | 263 | 209 |
| | Ex. 2 - No. 2 | o | 190 | 149 |
| | Ex. 2 - No. 3 | o | 236 | 185 |
| | Ex. 2 - No. 4 | o | 240 | 190 |
| | Ex. 2 - No. 5 | o | 241 | 191 |
| | Ex. 2 - No. 6 | o | 238 | 185 |
| | Ex. 2 - No. 7 | o | 245 | 200 |
| | Ex. 2 - No. 8 | o | 244 | 195 |
| | Ex. 2 - No. 9 | o | 230 | 190 |
| | Ex. 2 - No. 10 | o | 235 | 192 |
| | Ex. 2 - No. 11 | o | 228 | 185 |
| Comp. Ex. 6 | SBS alone used in Ex. 2 | x | 105 | 70 |
| Comp. Ex. 7 | SBS alone used in Ex. 2 was mixed with asphalt, followed by adding organo-phosphorus compd. No. 1 to the resultant mixture and mixing therewith. | | | |
| Comp. Ex. 8 | Organophosphorus compd. and SBS were used in the reverse order of Comp. Ex. 7. | Δ | 150 | 112 |

TABLE 5-continued

| | Modifiers and modifier compns. used, and prepn. methods for asphalt compns. | Compatibility, dispersibility, and solubility | Toughness (25° C.) kgf · cm | Tenacity (25° C.) kgf · cm |
|---|---|---|---|---|
| Comp. Ex. 9 | SBS alone used in Ex. 2 was mixed with asphalt, followed by adding organo-phosphorus compd. No. 2 to the resultant mixture and mixing therewith. | Δ | 160 | 110 |
| Comp. Ex. 10 | Organophosphorus compd. and SBS were used in the reverse order of Comp. Ex. 9. | Δ | 162 | 115 |

TABLE 6

| | Modifiers and modifier compns. used, and prepn. methods for asphalt compns. | Compatibility, dispersibility, and solubility | Toughness (25° C.) kgf · cm | Tenacity (25° C.) kgf · cm |
|---|---|---|---|---|
| Ex. | Ex. 3 - No. 1 | ○ | 215 | 173 |
| | Ex. 3 - No. 2 | ○ | 220 | 175 |
| | Ex. 3 - No. 3 | ○ | 218 | 178 |
| | Ex. 3 - No. 4 | ○ | 215 | 171 |
| | Ex. 3 - No. 5 | ○ | 216 | 168 |
| | Ex. 3 - No. 6 | ○ | 220 | 166 |
| | Ex. 3 - No. 7 | ○ | 210 | 166 |
| | Ex. 3 - No. 8 | ○ | 215 | 169 |
| | Ex. 3 - No. 9 | ○ | 215 | 175 |
| | Ex. 3 - No. 10 | ○ | 212 | 174 |
| | Ex. 3 - No. 11 | ○ | 210 | 170 |
| Comp. Ex. 11 | Polymer alone used in Ex. 3 | x | 152 | 100 |
| Comp. Ex. 12 | Polymer alone used in Ex. 3 was mixed with asphalt, followed by adding organo-phosphorus compd. No. 1 to the resultant mixture and mixing therewith. | Δ | 170 | 110 |
| Comp. Ex. 13 | Organophosphorus compd. and polymer were used in the reverse order of Comp. Ex. 12. | Δ | 171 | 111 |
| Comp. Ex. 14 | Polymer alone used in Ex. 3 was mixed with asphalt, followed by adding organo-phosphorus compd. No. 2 to the resultant mixture and mixing therewith. | Δ | 165 | 115 |
| Comp. Ex. 15 | Organophosphorus compd. And polymer were used in the reverse order of Comp. Ex. 14. | Δ | 166 | 113 |

TABLE 7

| | Modifiers and modifier compns. used, and prepn. methods for asphalt compns. | Compatibility, dispersibility, and solubility | Toughness (25° C.) kgf · cm | Tenacity (25° C.) kgf · cm |
|---|---|---|---|---|
| Ex. | Ex. 4 - No. 1 | ○ | 135 | 86 |
| | Ex. 4 - No. 2 | ○ | 100 | 58 |
| | Ex. 4 - No. 3 | ○ | 120 | 70 |
| | Ex. 4 - No. 4 | ○ | 122 | 74 |
| | Ex. 4 - No. 5 | ○ | 127 | 87 |
| | Ex. 4 - No. 6 | ○ | 100 | 64 |
| | Ex. 4 - No. 7 | ○ | 111 | 65 |
| | Ex. 4 - No. 8 | ○ | 118 | 67 |
| | Ex. 4 - No. 9 | ○ | 110 | 68 |
| | Ex. 4 - No. 10 | ○ | 115 | 65 |
| | Ex. 4 - No. 11 | ○ | 116 | 60 |
| Comp. Ex. 16 | EVA alone used in Ex. 4 | x | 53 | 10 |
| Comp. Ex. 17 | EVA alone used in Ex. 4 was mixed with asphalt, followed by adding organo-phosphorus compd. No. 1 to the resultant mixture and mixing therewith. | Δ | 75 | 21 |
| Comp. Ex. 18 | Organophosphorus compd. and polymer were used in the reverse order of Comp. Ex. 17. | Δ | 75 | 22 |
| Comp. Ex. 19 | EVA alone used in Ex. 4 was mixed with asphalt, followed by adding organo-phosphorus compd. No. 2 to the resultant mixture and mixing therewith. | Δ | 60 | 20 |
| Comp. Ex. 20 | Organophosphorus compd. and polymer were used in the reverse order of Comp. Ex. 19. | Δ | 64 | 15 |

<Results>

The asphalt compositions of the present invention had excellent compatibility of the modifier with the asphalt and excellent dispersibility and solubility of the modifier in the asphalt, not only immediately after the preparation thereof but also after storage at a high temperature. In contrast, the asphalt compositions not containing any acid organophosphorus compound, i.e., containing the asphalt modifier alone (Comparative Examples 1, 6, 11, and 16) suffered from marked lowering in dispersibility of the modifier in the asphalt after storage at a high temperature.

The asphalt compositions which were prepared by separately adding the modifier and the acid organo-phosphorus compound (Comparative Examples 2, 3, 4, 5, 7, 8, 9, 10, 12, 13, 14, 15, 17, 18, 19, and 20), though each of them contained both the modifier and the acid organophosphorus compound, caused a lowering in dispersibility of the modifier in the asphalt after storage at a high temperature.

Further, the asphalt compositions of the present invention had a large force of grasping the aggregate and, at the same time, a large resistance to an externally applied large change (deforming pressure). Example 6 and Comparative Examples 21 to 24.

By using the asphalt compositions prepared in Example 5, the following tests were conducted. The asphalt compositions were used immediately after the preparation thereof.

(Adhesion to Aggregate)

Rieder and Weber Test was conducted to confirm the adhesion of the asphalt composition to an aggregate. This testing method is one proposed by British Road Research Institute. More specifically, the test herein was conducted as follows.

43 parts by weight of crushed stones each having a particle diameter of 0.15 to 0.075 mm were mixed with 43 parts by weight of crushed stones each having a particle diameter of 0.3 to 0.15 mm, followed by heating to be at 180° C. 14 parts by weight of the asphalt composition which had been thoroughly melt-mixed at 180° C. was added to the crushed stone mixture. The resultant mixture was sufficiently agitated to completely coat the crushed stones with the asphalt composition. 0.5 g of the mixture comprising the crushed stones and the asphalt composition with which the crushed stones had been coated was put into a beaker containing 25 ml of each sodium carbonate solution having a predetermined concentration specified in Table 8, and the resultant mixture was boiled for one minute. Among the solutions which caused even a small amount of the asphalt composition to begin to be stripped from the crushed stones (i.e., the solutions wherein pieces of the asphalt composition stripped from the crushed stones floated), the solution having the lowest concentration was recorded, and the adhesion score of the asphalt composition was determined from the concentration according to the criteria indicated in Table 8.

TABLE 8

| Sodium carbonate concn. (M) | 0 | 1/256 | 1/128 | 1/64 | 1/32 | 1/16 | 1/8 | 1/4 | 1/2 | 1 |
|---|---|---|---|---|---|---|---|---|---|---|
| Adhesion score | 0 | 1 | 2 | 3 | 4 | 5 | 6 | 7 | 8 | 9 |

Note: When no stripping has been observed in the case where 1M solution of sodium carbonate was used, the adhesion score is 10.

(Water-immersion Wheel Tracking Test)

The water-immersion wheel tracking test specified in Hosou Shikenhou Binran (published by Japan Road Association) was conducted to examine the durability of each cured pavement composition containing the asphalt composition and the antistripping property of the asphalt composition. The water-immersion wheel tracking test is a wheel tracking test conducted in such a state that the sample is immersed in water and enables the influence of water on the pavement in actual use to simulate in a laboratory.

The pavement composition was prepared by feeding into a pugmill mixer a dense grade mix prepared by mixing crushed stone No. 6 (from Takatsuki), crushed stone No. 7 (from Takatsuki), sand (from Yodogawa), screenings (from Takatsuki), and stone powder (from Shiga Prefecture) together in a weight ratio of 35 25:20:13:7, and any of the asphalt compositions used in Example 5 and Comparative Examples 1 to 20 in a weight ratio of dense grade mix to asphalt composition of 95:5, and then agitating the resultant mixture for 20 seconds. Both the aggregate (dense grade mix) and the asphalt composition were used after being heated to 180° C. Resultant pavement compositions were each placed in a compaction mold and compacted by means of a roller compactor to prepare test pieces for the wheel tracking test.

Actual test conditions were more severe than usual conditions and were as follows.

The immersion curing time in water for the test piece was 6 hours; the temperature was 70° C.; the water level during the test was such that the half of the test piece was under water; and the contact pressure was 6.4 kgf/cm$^2$.

Six hours after the initiation of immersion curing in water, the percentage area of the asphalt composition stripped from the aggregate was visually evaluated. When the test piece was broken within six hours after the initiation of immersion curing due to stripping of the asphalt composition from the aggregate, the test was stopped at that point.

The evaluation results are given in Table 9.

TABLE 9

| | Modifiers and modifier compns. used | Adhesion to aggregate (adhesion score) | Percentage stripping after water-immersion wheel tracking test (%) |
|---|---|---|---|
| Ex. | Ex. 1 - No. 1 | 6 | 10 |
| | Ex. 1 - No. 2 | 8 | 5 |
| | Ex. 1 - No. 3 | 10 | 2 |
| Comp. Ex. 21 | SBR alone used in Ex. 1 | 3 | 30 |
| Ex. | Ex. 2 - No. 4 | 10 | 0 |
| | Ex. 2 - No. 5 | 10 | 0 |
| | Ex. 2 - No. 6 | 9 | 2 |
| Comp. Ex. 22 | SBS alone used in Ex. 2 | 2 | 40 |
| Ex. | Ex. 3 - No. 9 | 10 | 0 |
| | Ex. 3 - No. 11 | 10 | 0 |
| | Ex. 3 - No. 13 | 10 | 0 |
| Comp. Ex. 23 | Polymer alone used in Ex. 3 | 2 | 50 |
| | Ex. 4 - No. 3 | 10 | 5 |
| | Ex. 4 - No. 4 | 10 | 0 |
| | Ex. 4 - No. 5 | 10 | 0 |
| Comp. Ex. 24 | EVA alone used in Ex. 4 | 1 | 55 |

<Results>

The Examples wherein the asphalt composition of the present invention were used were excellent in both the adhesion to an aggregate and the antistripping property in the water-immersion wheel tracking test. On the contrary, in the Comparative Examples, these properties were inferior thereto.

Example 7

The inorganic phosphorus compounds and the compounds having a hydroxyl group(s) listed in Table 10 and a commercially available styrene-butadiene-styrene block copolymer (SBS) (Solprene 406, manufactured by Asahi Chemical Industries Co., Ltd.) were weighed at the ratios specified in Table 10, followed by mixing. The resultant mixtures were kneaded by means of an 8-inches roll kneader under the conditions of the number of revolutions of 15 rpm, the temperature of 200° C., and the mixing time of 10 min to prepare asphalt modifier compositions.

TABLE 10

| No. | Inorganic phosphorus compd. (1) | Compd. having hydroxyl group (2) | Mixing ratio (by wt.) (1)/(2)/SBS |
|---|---|---|---|
| No. 1 | $P_2O_5$ | Stearyl alcohol | 0.4/0.6/99 |
| No. 2 | $P_2O_5$ | Stearyl alcohol | 0.8/1.8/97.4 |
| No. 3 | $P_2O_5$ | Beef tallow alcohol | 1.0/3.0/96.0 |
| No. 4 | $P_2O_5$ | Beef tallow alcohol | 3.0/5.0/92.0 |
| No. 5 | $P_2O_5$ | Beef tallow alcohol | 5.0/8.0/87.0 |
| No. 6 | Polyphosphoric acid | Polyethylene glycol (mol. wt.: 400) | 1.0/3.0/96.0 |
| No. 7 | Polyphosphoric acid | Polyethylene glycol (mol. wt.: 400) | 1.0/8.0/91.0 |
| No. 8 | Polyphosphoric acid | Polyethylene glycol (mol. wt.: 400) | 3.0/100/870 |
| No. 9 | Polyphosphoric acid | Polyethylene glycol (mol. wt.: 400) | 5.0/15.0/80.0 |
| No. 10 | $P_2O_5$ | Beef tallow alcohol | 3.0/5.0/92.0 |

Example 8 and Comparative Examples 25 to 29

Asphalt compositions were prepared in the same manner as that in Example 5, except that the asphalt modifier compositions prepared in Example 7 were used. The resultant asphalt compositions were evaluated for the compatibility of the modifier with the asphalt and the dispersibility and solubility of the modifier in the asphalt. Further, they were subjected to toughness and tenacity tests. The evaluation results are given in Table 11.

TABLE 11

| | Modifiers and modifier compns. used, and prepn. methods for asphalt compns. | Compatibility, dispersibility, and solubility | Toughness (25° C.) kgf · cm | Tenacity (25° C.) kgf · cm |
|---|---|---|---|---|
| Ex. | Ex. 8 - No. 1 | o | 245 | 200 |
| | Ex. 8 - No. 2 | o | 243 | 191 |
| | Ex. 8 - No. 3 | o | 257 | 200 |
| | Ex. 8 - No. 4 | o | 229 | 179 |
| | Ex. 8 - No. 5 | o | 211 | 187 |
| | Ex. 8 - No. 6 | o | 235 | 189 |
| | Ex. 8 - No. 7 | o | 227 | 190 |
| | Ex. 8 - No. 8 | o | 209 | 150 |
| | Ex. 8 - No. 9 | o | 206 | 153 |
| | Ex. 8 - No. 10 | o | 225 | 172 |
| Comp. Ex. 25 | SBS alone used in Ex. 8 | x | 107 | 53 |
| Comp. Ex. 26 | SBS alone used in Ex. 8 was mixed with asphalt, followed by adding composition No. 1 to the resultant mixture and mixing therewith. | Δ | 142 | 109 |
| Comp. Ex. 27 | Composition No. 1 and SBS were used in the reverse order of Comp. Ex. 26. | Δ | 151 | 110 |
| Comp. Ex. 28 | SBS alone used in Ex. 8 was mixed with asphalt, followed by adding composition No. 2 to the resultant mixture and mixing therewith. | Δ | 137 | 104 |
| Comp. Ex. 29 | Mix No. 2 and SBS used in the reverse order of Comp. Ex. 28 | Δ | 141 | 105 |

(Results)

The asphalt compositions of the present invention had excellent compatibility of the modifier with the asphalt, and excellent dispersibility and solubility of the modifier in the asphalt, not only immediately after the preparation thereof but also after storage at a high temperature. That is, the modifier was dispersed or dissolved in the asphalt without causing separation from the asphalt. In contrast, the asphalt composition containing neither the inorganic phosphorus compound nor the compound having a hydroxyl group (Comparative Example 25) suffered from marked lowering in dispersibility of the modifier in the asphalt after storage at a high temperature.

The asphalt compositions (Comparative Examples 26, 27, 28, and 29) containing the modifier, the inorganic phosphorus compound, and the compound having a hydroxyl group, provided that they were prepared by separately adding the modifier, and the mixture comprising the inorganic phosphorus compound and the compound having a hydroxyl group, caused a lowering in dispersibility of the modifier in the asphalt after storage at a high temperature.

Further, the asphalt compositions of the present invention had a large force for grasping the aggregate and, at the same time, a large resistance to an externally applied large change (deforming pressure). Example 9 and Comparative Example 30.

By using the asphalt composition prepared in Example 8, the same tests as those in Example 6 were conducted. The asphalt compositions were used immediately after the preparation thereof. The evaluation results are given in Table 12.

TABLE 12

| | Modifiers and modifier compns. Used | Adhesion to aggregate (adhesion score) | Percentage stripping after water-immersion wheel tracking test (%) |
|---|---|---|---|
| Ex. | Ex. 9 - No. 1 | 7 | 11 |
| | Ex. 9 - No. 2 | 8 | 5 |
| | Ex. 9 - No. 3 | 10 | 2 |
| | Ex. 9 - No. 4 | 10 | 0 |
| | Ex. 9 - No. 5 | 10 | 0 |
| | Ex. 9 - No. 6 | 9 | 1 |
| | Ex. 9 - No. 7 | 10 | 0 |
| | Ex. 9 - No. 8 | 10 | 0 |
| | Ex. 9 - No. 9 | 10 | 0 |
| | Ex. 9 - No. 10 | 10 | 0 |
| Comp. Ex. 30 | Polymer alone used in Ex. 9 | 2 | 50 |

<Results>

The Examples wherein the asphalt composition of the present invention were used were excellent in both the adhesion to an aggregate and the antistripping property in the water-immersion wheel tracking test. On the contrary, in the Comparative Examples, these properties were inferior thereto.

Example 10

An adduct of bisphenol A with ethylene oxide added in an amount of 2.2 mol per mol of bisphenol A was employed as an alcohol component, and terephthalic acid was employed as an acid component. The ethylene oxide adduct of bisphenol A was reacted with terephthalic acid in a molar ratio of alcohol component to acid component of 1.1:1 at 240° C. in the presence of dibutyltin oxide as a catalyst (dehydration esterification reaction). When the melting point (as measured according to JIS K-2207) of the reaction mixture reached 150° C., each inorganic phosphorus compound listed in Table 13 was added to the reaction mixture in a molten state. The resultant composition was further mixed for 10 minutes to homogeneously disperse the inorganic phosphorus compound therein. After cooling, the obtained composition was ground. Thus, modifier compositions each comprising a polyester resin and a phosphorus compound were prepared.

TABLE 13

| No. | Inorgaic phosphorus compounds | Mixing ratio (by wt.) phorphorus compd./ polyester |
|---|---|---|
| No. 1 | $P_2O_5$ | 0.5/99.5 |
| No. 2 | $P_2O_5$ | 1/99 |
| No. 3 | $P_2O_5$ | 3/97 |
| No. 4 | $P_2O_5$ | 5/95 |
| No. 5 | $P_2O_5$ | 10/90 |
| No. 6 | Polyphosphoric acid | 3/97 |
| No. 7 | $P_2O_5$ | 3/97 |

Example 11 and Comparative Examples 31 to 35

Asphalt compositions were prepared in the same manner as that in Example 5, except that the asphalt modifier compositions prepared in Example 10 were used. The resultant asphalt compositions were evaluated for the compatibility of the modifier with the asphalt and the dispersibility and solubility of the modifier in the asphalt. Further, they were subjected to toughness and tenacity tests. The evaluation results are given in Table 14.

TABLE 14

| | Modifiers and modifier compns. used, and prepn. methods for asphalt compns. | Compatibility, dispersibility, and solubility | Toughness (25° C.) kgf · cm | Tenacity (25° C.) kgf · cm |
|---|---|---|---|---|
| Ex. | Ex. 11 - No. 1 | o | 145 | 90 |
| | Ex. 11 - No. 2 | o | 143 | 101 |
| | Ex. 11 - No. 3 | o | 137 | 90 |
| | Ex. 11 - No. 4 | o | 159 | 109 |
| | Ex. 11 - No. 5 | o | 161 | 97 |
| | Ex. 11 - No. 6 | o | 155 | 119 |
| | Ex. 11 - No. 7 | o | 167 | 110 |
| Comp. Ex. 31 | Polyester resin alone used in Ex. 11 | x | 97 | 33 |
| Comp. Ex. 32 | Polyester resin alone used in Ex. 11 was mixed with asphalt, followed by adding inorganic phosphorus compd. No. 3 to the resultant mixture and mixing therewith. | Δ | 112 | 59 |
| Comp. Ex. 33 | Inorganic phosphorus compd. and polyester resin were used in the reverse order of Comp. Ex. 32. | Δ | 111 | 50 |
| Comp. Ex. 34 | Polyester resin alone used in Ex. 11 was mixed with asphalt, followed by adding inorganic phosphorus compd. No. 6 to the resultant mixture and mixing therewith. | Δ | 110 | 54 |
| Comp. Ex. 35 | Inorganic phosphorus compd. and polyester resin were used in the reverse order of Comp. Ex. 34. | Δ | 105 | 55 |

(Results)

The asphalt compositions of the present invention had excellent compatibility of the modifier with the asphalt, and excellent dispersibility and solubility of the modifier in the asphalt, not only immediately after the preparation thereof but also after storage at a high temperature. In contrast, the asphalt composition not containing any inorganic phosphorus compound (Comparative Example 31) suffered from marked lowering in dispersibility of the modifier in the asphalt after storage at a high temperature.

The asphalt compositions which were prepared by separately adding the modifier and the inorganic phosphorus compound (Comparative Examples 32, 33, 34, and 35), though each of them contained both the modifier and the inorganic phosphorus compound, caused a lowering in dispersibility of the modifier in the asphalt after storage at a high temperature.

Further, the asphalt compositions of the present invention had a large force of grasping the aggregate and, at the same time, a large resistance to an externally applied large change (deforming pressure). Example 12 and Comparative Example 36.

By using the asphalt compositions prepared in Example 11, the tests the same as those in Example 6 were conducted. The asphalt compositions were used immediately after the preparation thereof. The evaluation results are given in Table 15.

TABLE 15

| | Modifiers and modifier compns. Used | Adhesion to aggregate (adhesion score) | Percentage stripping after water-immersion wheel tracking test (%) |
|---|---|---|---|
| Ex. | Ex. 12 - No. 1 | 5 | 12 |
| | Ex. 12 - No. 2 | 7 | 6 |
| | Ex. 12 - No. 3 | 9 | 2 |
| | Ex. 12 - No. 4 | 10 | 0 |
| | Ex. 12 - No. 5 | 10 | 0 |
| | Ex. 12 - No. 6 | 10 | 0 |
| | Ex. 12 - No. 7 | 10 | 0 |
| Comp. Ex. 36 | Polymer alone used in Ex. 12 | 1 | 55 |

(Results)

The Examples wherein the asphalt compositions of the present invention were used were excellent in both the adhesion to an aggregate and the antistripping property in the water-immersion wheel tracking test. On the contrary, in the Comparative Example, these properties were inferior thereto.

As described above, the asphalt compositions of the present invention which were prepared by using the asphalt modifier compositions of the present invention were excellent in compatibility of the modifier with the asphalt and dispersibility and solubility in the asphalt, and such the excellent properties were the resultant pavement has markedly improved in rutting resistance and wearing resistance. Therefore, such the pavement has a prolonged service life maintained even after storage of the asphalt compositions at a high temperature. Therefore, the asphalt compositions of the present invention, when stored in an asphalt production plant and an asphalt mixture plant, do not cause any trouble resulting from the separation of the modifier. That is, the asphalt modifier compositions of the present invention have excellent properties capable of improving the properties of asphalt. When therefore the asphalt composition of the present invention is used as a paving material, they can provide pavements which are less likely to cause rutting and wearing.

Further, since the asphalt compositions of the present invention have improved adhesion to an aggregate, pavements laid by using the same have a prolonged service life.

Although the present invention has thus been described, it will be apparent that various changes may be made in many ways without departing the spirit and scope of the invention and that all of such modifications which are obvious to a person having ordinary skill in the art will fall within the scope of the present invention as defined in the following claims.

What is claimed is:

1. A process for producing an asphalt composition, comprising the steps of:

preparing an asphalt modifier by a first mixing of at least one member selected from the group consisting of rubber, elastomer and synthetic polymer, with 0.1 to 30 percent by weight of an acid organophosphorus compound, based on the total weight of the organophosphorus and said at least one member;

the acid organophosphorus compound is represented by the following formula (1):

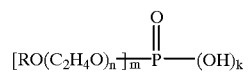 (1)

wherein R represents a saturated or unsaturated aliphatic hydrocarbon group having 8 to 36 carbon atoms or an alkylphenyl group having 6 to 26 carbon atoms in total; m is 1 or 2 and k is 1 or 2, provided that the sum of m and k is 3; and the product of m and n, which represents the average number of ethylene oxide molecules added per molecule, is 0 to 20; and then a second mixing of the asphalt modifier with asphalt.

2. The process according to claim 1, further comprising mixing the acid organophosphorus compound of formula (1) with an inorganic phosphorus compound.

3. The process according to claim 2, further comprising mixing the inorganic phosphorus compound with a mono- or polyhydric alcohol capable of bonding to the inorganic phosphorus compound.

4. The process according to claim 1, wherein the first mixing is conducted by extrusion at 50 to 200° C.

5. The process according to claim 1, wherein the acid organophosphorus compound is a mixture of a monoester and a diester at a ratio between 60/40 and 90/10.

6. The process according to claim 1, wherein said at least one member is styrene-butadiene rubber or styrene-butadiene-styrene block copolymer.

* * * * *

UNITED STATES PATENT AND TRADEMARK OFFICE
CERTIFICATE OF CORRECTION

PATENT NO    : 5,990,206
DATED        : November 23, 1999
INVENTOR(S)  : Shingo TANAKA et al.

It is certified that error appears in the above-identified patent and that said Letters Patent are hereby corrected as shown below:

On the title page:

[30] Foreign Application Priority Data

Change "8-840833" to --8-40833--.

Signed and Sealed this

Third Day of April, 2001

NICHOLAS P. GODICI

*Attest:*

*Attesting Officer*    Acting Director of the United States Patent and Trademark Office